US011811498B2

(12) United States Patent
Jiang et al.

(10) Patent No.: US 11,811,498 B2
(45) Date of Patent: Nov. 7, 2023

(54) METHODS AND APPARATUS FOR FEEDBACK CONTROL OF MODE MUX AND DEMUX

(71) Applicant: HUAWEI TECHNOLOGIES CO., LTD., Shenzhen (CN)

(72) Inventors: Zhiping Jiang, Kanata (CA); Jiachuan Lin, Quebec (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 168 days.

(21) Appl. No.: 17/319,751

(22) Filed: May 13, 2021

(65) Prior Publication Data

US 2022/0368449 A1    Nov. 17, 2022

(51) Int. Cl.
*H04J 14/02* (2006.01)

(52) U.S. Cl.
CPC ................ *H04J 14/0227* (2013.01)

(58) Field of Classification Search
CPC ..... H04J 14/0227; H04J 14/0276; H04J 14/04
See application file for complete search history.

(56) References Cited

U.S. PATENT DOCUMENTS

| | | | | |
|---|---|---|---|---|
| 6,559,984 | B1* | 5/2003 | Lee ..................... | H04J 14/0227 398/5 |
| 6,735,395 | B1* | 5/2004 | Bai ..................... | H04B 10/504 398/94 |
| 8,190,033 | B2* | 5/2012 | Tu ..................... | H01S 5/0687 398/198 |
| 10,574,382 | B2 | 2/2020 | Jiang et al. | |
| 10,979,167 | B2 | 4/2021 | Jiang | |
| 2003/0026528 | A1* | 2/2003 | Kimotsuki ............. | H04J 14/02 385/24 |

(Continued)

FOREIGN PATENT DOCUMENTS

| | | |
|---|---|---|
| CN | 105610565 A | 5/2016 |
| CN | 109600221 A | 4/2019 |
| JP | 5801926 B1 | 10/2015 |

OTHER PUBLICATIONS

Y. Chen, et al., "Integrated circularly polarized OAM generator and multiplexer for fiber transmission," IEEE Journal of Quantum Electronics, vol. 54, No. 2, 2017, pp. 1-9.

(Continued)

*Primary Examiner* — Steven Hieu D Nguyen

(57) ABSTRACT

Aspects of the disclosure provide for methods and systems for feedback control of mode MUX and DEMUX. An aspect of the disclosure provides for a method associated with a mode MUX. The method includes modulating each WDM signal of a first set of WDM signals with a pilot tone of different frequency. The method further includes spatially multiplexing the first set of WDM signals to generate a multi-mode signal. The method further includes detecting the pilot tones from the multi-mode signal. The method further includes tuning the mode MUX based on the detecting. Another aspect of the disclosure provides for a method associated with a mode DEMUX. The method includes spatially demultiplexing a multi-mode signal into a set of WDM signals. The method further incudes detecting pilot tones from the set of WDM signals and tuning the mode DEMUX based on the detecting.

17 Claims, 15 Drawing Sheets

(56) References Cited

U.S. PATENT DOCUMENTS

| | | | |
|---|---|---|---|
| 2013/0251365 A1* | 9/2013 | Sone | H04J 14/0201 |
| | | | 398/38 |
| 2015/0222356 A1 | 8/2015 | Kawanishi et al. | |
| 2016/0301496 A1* | 10/2016 | Eiselt | H04B 10/0775 |
| 2017/0353242 A1* | 12/2017 | Mansouri Rad | H04J 14/04 |
| 2018/0234185 A1* | 8/2018 | Ferreira | H04B 10/2581 |
| 2018/0302154 A1* | 10/2018 | Ferreira | H04B 10/272 |

OTHER PUBLICATIONS

H. Chen, et al., "Remote Spatio-Temporal Focusing Over Multimode Fiber Enabled by Single-Ended Channel Estimation," IEEE Journal of Selected Topics in Quantum Electronics, vol. 26, No. 4, 2020, pp. 1-9.

* cited by examiner

METHODS AND APPARATUS FOR FEEDBACK CONTROL OF MODE MUX AND DEMUX

CROSS-REFERENCE TO RELATED APPLICATIONS

This is the first application filed for the present invention.

FIELD OF THE INVENTION

The present invention pertains to the field of optical communications, and in particular to methods and apparatus for feedback control of mode MUX and DEMUX.

BACKGROUND

In optical transmission systems, efforts have been made to increase system spectrum efficiency (SE) in order to achieve a better hardware efficiency and increased total system capacity. Both wavelength dimension and polarization dimension have been studied in single mode fiber transmission systems. However, due to fiber loss and useable wavelength resource (limited by the bandwidth of optical amplifier), the current transmission system is reaching the Shannon limit, i.e., the capacity may not be increased in a single fiber without exploring other multiplexing dimensions. To further increase the system capacity, one multiplexing dimension that can be used is spatial division multiplexing (SDM), which may include mode multiplexer/de-multiplexer (MUX/DEMUX). In addition, fabrication error or temperature fluctuation may lead to increased impairments and limitations in optical components, which further limit the total system capacity that may be achieved.

Therefore, there is a need for methods and apparatus that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An aspect of the disclosure provides for a method. The method includes modulating each WDM signal of a first set of WDM signals with a pilot tone of different frequency, wherein each WDM signal is in fundamental mode. In some embodiments, the modulating each WDM signal includes modulating each data channel of each WDM signal with a pilot tone of different frequency. The method further includes spatially multiplexing, by a mode multiplexer (MUX), the first set of WDM signals to generate a multimode signal, the multimode signal including the pilot tones. The method further includes detecting the pilot tones from the multi-mode signal. The method further includes tuning the mode MUX based on the detecting. By tuning the mode MUX, the method may provide for improved MUX performance by reducing crosstalk caused by fabrication errors. In addition, the method may obviate the need to use massive MIMO at receiver side, thereby reducing power consumption. And yet further, the method may provide for increased system tolerance to fabrication error.

In some embodiments, the detecting includes tapping part of the multi-mode signal including the pilot tones. In some embodiments, the detecting further includes spatially demultiplexing, by a mode demultiplexer (DEMUX), the tapped part of the multi-mode signal into a second set of WDM signals, wherein each WDM signal of the second set of WDM signals is in fundamental mode. In some embodiments, the detecting further includes filtering, by a set of optical bandpass filter (OBPF), the second set of WDM signals. In some embodiments, the detecting further includes detecting, by a set of photodetectors (PDs), the filtered set of WDM signals. The method may provide for a monitoring means to ensure consistent and improved MUX performance.

In some embodiments, the tuning includes amplifying, by a set of transimpedance amplifiers, outputs of the set of the PDs, the outputs including the pilot tones. In some embodiments, the tuning further includes sampling, by a set of analog to digital convertors (ADCs), the amplified outputs. In some embodiments, the tuning further includes processing, by a digital signal processing (DSP), the sampled amplified outputs. In some embodiments, the tuning further includes applying, by the DSP, a tuning voltage to the mode MUX based on the processing. Embodiments may mitigate the mode crosstalk caused by MUX imperfections, thereby contributing to a better bit error rate for each spatial mode.

In some embodiments, the method further includes further processing change in power level of the pilot tones after applying the tuning voltage. In some embodiments, the method further includes applying, by the DSP, a search algorithm based on the further processing. The method may provide for continued improved performance via reduced crosstalk.

In some embodiments, the tapping includes tapping, by a multi-mode coupler, part of the multi-mode signal, the multi-mode coupler placed at the output of the mode MUX. In some embodiments the processing includes determining power level of each pilot tone.

In some embodiments the tapping includes reflecting, by a partial reflector, part of the multi-mode signal, the partial reflector placed at the output of the mode MUX. In some embodiments, the tapping further includes tapping, by a set of optical circulators, the second set of WDM signals.

In some embodiments, the spatially demultiplexing includes spatially demultiplexing, by the mode DEMUX, the reflected part of the multi-mode signal into the second set of WDM signals, wherein each WDM signal of the second set of WDM signals is in fundamental modes.

In some embodiments the mode DEMUX is the mode MUX in reverse. Such embodiments may provide for a more compact implementation for MUX-side feedback control, at reduced cost (since no additional mode DEMUX may be required to be deployed).

Another aspect of the disclosure provides for another method. The method includes spatially demultiplexing, by a mode demultiplexer (DEMUX), a multi-mode signal into a set of WDM signals, wherein each WDM signal is in fundamental mode and is modulated with a pilot tone of different frequency. The method further incudes detecting the pilot tones from the set of WDM signals. The method further incudes tuning the mode DEMUX based on the detecting. By tuning the mode MUX, the method may provide for improved DEMUX performance by reducing crosstalk caused by fabrication errors. In addition, the method may provide for increased system tolerance to fabrication error.

In some embodiments, the detecting includes demultiplexing, by a wavelength DEMUX, each WDM signal into the set of wavelength channels. In some embodiments, the detecting further includes tapping part of light including the pilot tone at each wavelength channel of the set of wavelength channels. In some embodiments, the detecting further includes detecting, by a set of photodetectors (PDs), the tapped light. The method may provide for a monitoring means to ensure consistent and improved DEMUX performance.

In some embodiments, the tuning includes amplifying, by a set of transimpedance amplifiers, outputs of the set of the PDs, the outputs including the pilot tones. In some embodiments, the tuning further includes sampling, by a set of analog to digital convertors (ADCs), the amplified outputs. In some embodiments, the tuning further includes processing, by a digital signal processing (DSP), the sampled amplified outputs. In some embodiments, the tuning further includes applying, by the DSP, a tuning voltage to the mode DEMXU based on the processing. Embodiments may mitigate the mode crosstalk caused by DEMUX imperfections, thereby contributing to improved better bit error rate.

In some embodiments, the method further includes further processing change in power level of the pilot tones after applying the tuning voltage. In some embodiments, the method further includes applying, by the DSP, a search algorithm based on the further processing.

In some embodiments, the tapping is performed by a set of single mode tap couplers.

In some embodiments, the detecting includes demultiplexing, by a wavelength DEMUX, each WDM signal into the set of wavelength channels. In some embodiments, the detecting further includes detecting, by a set of coherent receivers, the pilot tones at each wavelength channel. In some embodiments, the detecting further includes processing, by the set of coherent receivers, power levels of the detected pilot tones. In some embodiments, the detecting further includes sending, by the set of coherent receivers to a digital signal processing (DSP), the processed power levels. The method may provide for taking advantage of coherent receiver and coherent DSP module, thereby obviating the need for additional optical components and reduced costs.

In some embodiments, the tuning includes applying, by the DSP, a tuning voltage to the mode DEMXU based on the processed power levels. In some embodiments, each WDM signal is modulated via modulating each data channel of each WDM signal with a pilot tone of different frequency.

In some embodiments, the method further includes further processing change in power level of the pilot tones after applying the tuning voltage. In some embodiments, the method further includes applying, by the DSP, a search algorithm based on the further processing. The method may provide for continued monitoring and continued improved performance.

Another aspect of the disclosure provides for an apparatus. The apparatus includes a receiver, a processor, and a non-transitory memory storing machine executable instructions, which when executed by the processor, configure the apparatus for performing the one or more methods described herein. For example, the method includes modulating each wavelength division multiplexing (WDM) signal of a first set of WDM signals with a pilot tone of different frequency, wherein each WDM signal is in fundamental mode. The method further includes spatially multiplexing, by a mode multiplexer (MUX), the first set of WDM signals to generate a multi-mode signal, the multimode signal comprising the pilot tones. The method further includes detecting the pilot tones from the multi-mode signal. The method further includes tuning the mode MUX based on the detecting.

In another embodiment, the non-transitory memory storing machine executable instructions, which when executed by the processor, configure the apparatus for performing another method. The method includes spatially demultiplexing, by a mode demultiplexer (DEMUX), a multi-mode signal into a set of wavelength division multiplexing (WDM) signals, wherein each WDM signal is in fundamental mode and is modulated with a pilot tone of different frequency. The method further includes detecting the pilot tones from the set of WDM signals; and tuning the mode DEMUX based on the detecting.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As mentioned, efforts have made have been made to increase system spectrum efficiency (SE) in order to achieve a better hardware efficiency and larger total system capacity. By increasing the SE by a factor of M, the total capacity of the transmission system may be increased by a factor of M accordingly. One way to improve SE may be to use multi-dimension multiplexing. Both wavelength dimension and polarization dimension have been studied in single mode fiber transmission system, which has led to commercial transmission systems, i.e., the dual-polarization (DP) based wavelength division multiplexing (WDM) system.

However, due to fiber loss and useable wavelength resource (limited by the bandwidth of optical amplifier), the current transmission system is reaching the Shannon limit, i.e., the capacity may not be increased in a single fiber without exploring other multiplexing dimensions.

Besides polarization and wavelength, another dimension that may be used is spatial mode. A single mode fiber (which has been widely deployed in nowadays optical communication system), having a core diameter of around 8~10 μm, may only allow fundamental spatial mode to be propagated along the fiber, i.e., single mode system. An increase in the core size, such as large core, ring-core, elliptical core, etc., may allow for higher order spatial modes of light to propagate. These high order modes may be used to carry additional data channels, i.e., multi-mode division multiplexing (MDM) system. A fiber that supports multi-mode transmission may be referred to as a multi-mode fiber (MMF).

A person skilled in the art may appreciate that there may be various types of spatial modes and their corresponding fiber design to support them. For example, an elliptical core fiber may support high order linear polarization vector (LPV) mode. LPV modes of different order may exhibit different intensity patterns as may be appreciated by a person skilled in the art. Another example of fiber design may be a ring core fiber, which supports orbital angular moment (OAM) mode. Different order OAM modes may exhibit different phase fronts, intensity and phase pattern as may be appreciated by a person skilled in the art.

By using spatial modes, more than one channel over the same wavelength without interference may be transmitted. With this concept, multiple-WDM signals may be transmitted simultaneously in a multi-mode system, while only 1-WDM signal can be transmitted in single mode system. Thus, the total capacity may be significantly increased.

Figure 1:
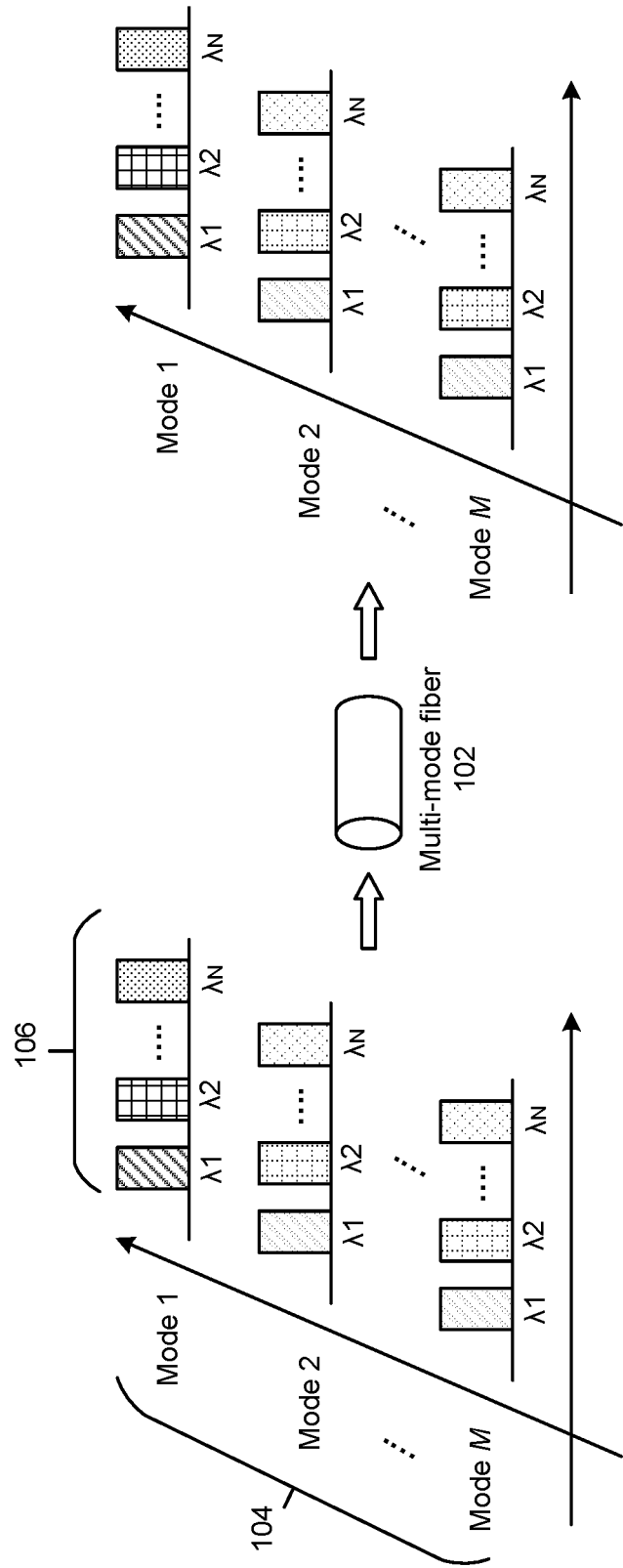
FIG. 1 illustrates a spatial mode multiplexed signal transmission, according to an embodiment of the present disclosure.

FIG. 1 illustrates a spatial mode multiplexed signal transmission, according to an embodiment of the present disclosure. As may be appreciated by a person skilled in the art, MDM is one method for spatial division multiplexing for optical transmission system. As mentioned herein, MDM system may use different modes to send data over the same wavelength in the same fiber, thereby allowing for improved system capacity and spectrum efficiency. Referring to FIG. 1, the multi-mode fiber (MMF) 102 may supports spatial modes 104 of order 1, 2 . . . M, (SE can be increased by a factor of M compared to a single mode fiber), and each mode may carry an independent WDM signal that consists of N wavelength channels 106 of $\lambda_1, \lambda_2 \ldots \lambda_N$ as illustrated.

With the help of MDM, a set of M WDM signals may be multiplexed together by a mode multiplexer (MUX) and transmitted through a MMF, for example, MM fiber 102, without affecting each other, as illustrated in FIG. 1. It should be appreciated that the set is a non-empty set. At the receiver, the M WDM signals may be separated by a spatial mode de-multiplexer (DEMUX). Each WDM signal may be further de-multiplexed on wavelength dimension, to totally separate all data channels.

Figure 2:
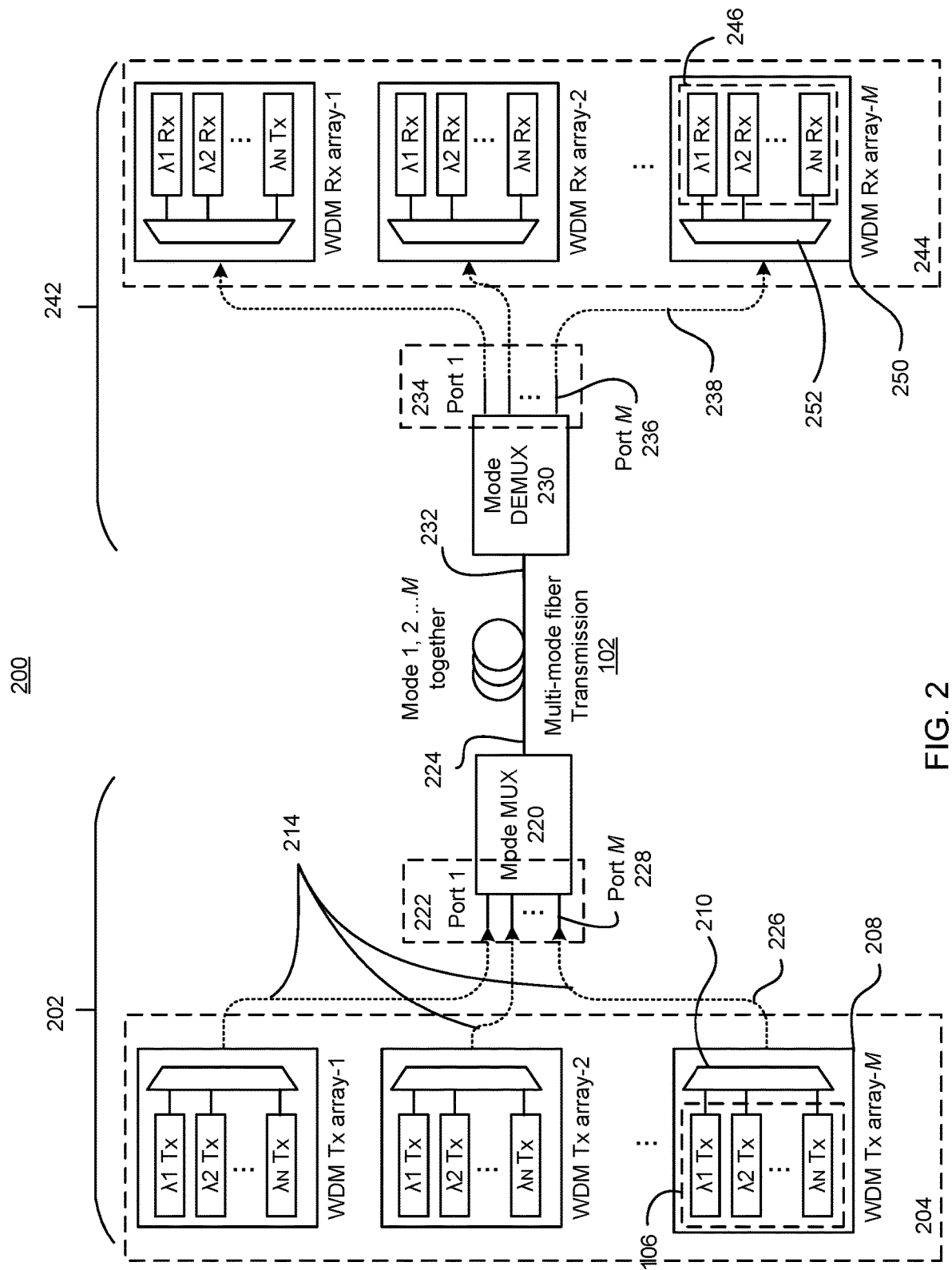
FIG. 2 illustrates a configuration of a typical mode division multiplexing (MDM) system, according to an embodiment of the present disclosure.

FIG. 2 illustrates a configuration of an MDM system, according to an embodiment of the present disclosure. As may be appreciated by a person skilled in the art, in the MDM system, for example MDM system 200, the key component may be the mode MUX 220 and the mode DEMUX 230. The mode MUX 220 may have M single mode (operating at the fundamental mode) input ports 222 and one multi-mode output port 224. The function of the mode-MUX 220 may be to convert m-th, m ∈ [1, M], input light from fundamental mode to m-th order of spatial mode (for example, the M-th input light 226 may be converted from fundamental mode to M-th order of spatial mode), and multiplex all the M spatial modes together, generating a multi-mode output at output port 224. Similarly, the mode DEMUX 230 may comprise one multi-mode input port 232 and M single mode output ports 234.

Referring to FIG. 2, the transmitter (Tx) side (or MUX side) 202 may include M WDM Tx arrays 204. Each WDM Tx array may comprise N data channels 106 with wavelength from $\lambda_1$ to $\lambda_N$.

For example, in the M-th WDM-Tx array 208, the data channels 106 with different wavelength are firstly multiplexed by a WDM multiplexer 210 to generate the M-th WDM signal (in fundamental fiber mode) 226, then the M-th WDM signal 226 is sent to the port-M 228 of the mode MUX 220. The mode MUX 220 may convert all M WDM signals 214 into different M spatial modes and combine them all to generate a multi-mode signal, then coupled into a MMF 102 for transmission.

The receiver side 242 may include M WDM Rx arrays 244. Each WDM Rx array may comprise N data channels 246 with wavelengths $\lambda_1$ to $\lambda_N$ as illustrated. At the receiver side 242, the multi-mode light may pass through the mode DEMUX 230 first, where the M-th spatial mode, for example, will be converted back into fundamental mode and conducted to the M-th output port 236 (of m ports 234. Each of the spatially de-multiplexed WDM signal may then pass through a WDM DEMUX. After that, each wavelength data channel may be separated and detected by a different receiver. For example, the M-th spatially de-multiplexed WDM signal 238 may pass through the WDM DEMUX 252 of the WDM Rx array 250. Then each wavelength data channel may be separated and detected by a different receiver 246.

In theory, as may be appreciated by a person skilled in the art, the data channels with same wavelength but in different modes would not affect each other. However, the components implementing mode MUX 220 or DEMUX 230 may not be error-free. A small fabrication error or temperature fluctuation may lead to significant crosstalk between different spatial modes at the same wavelength.

Figure 3:
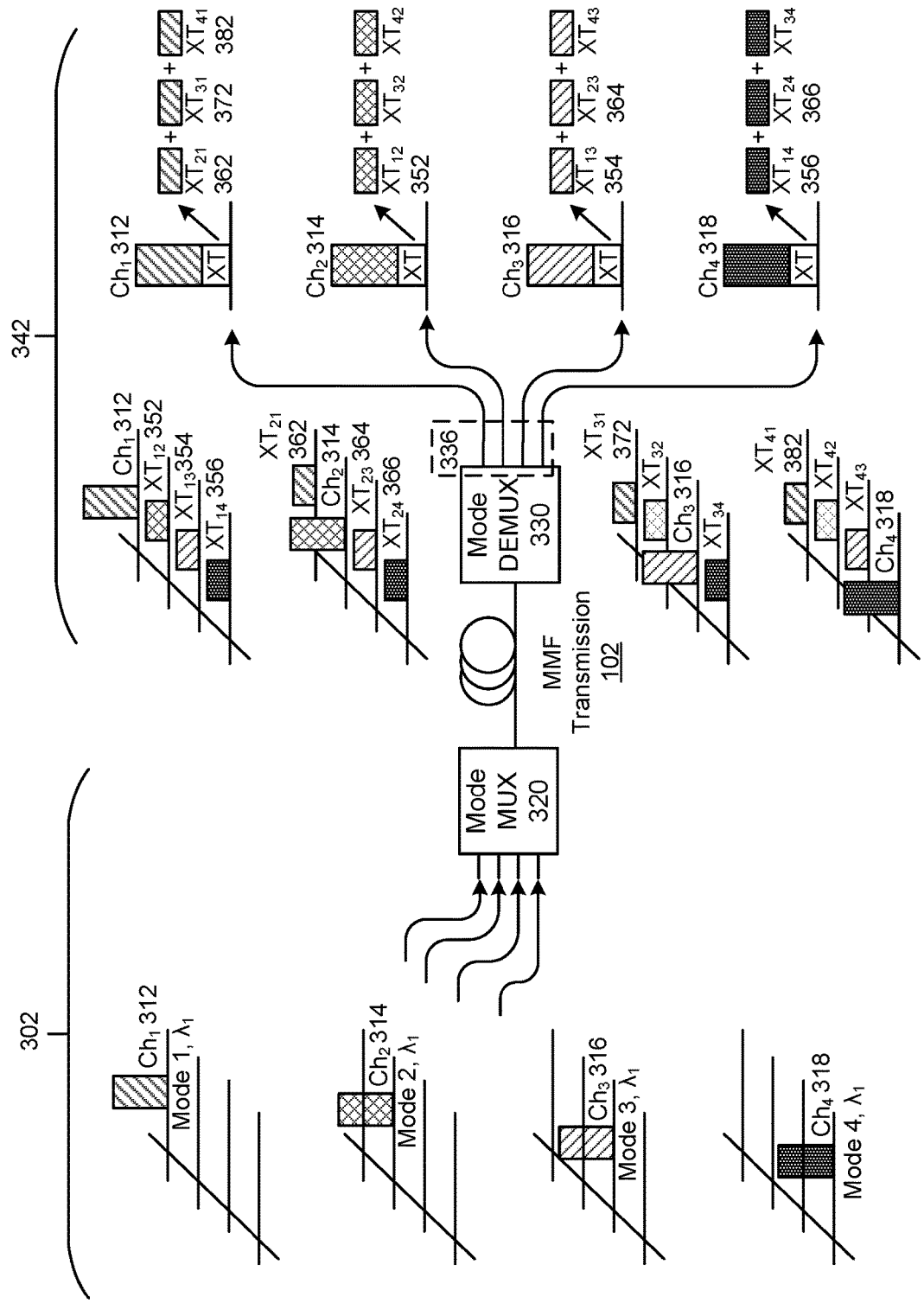
FIG. 3 illustrates crosstalk generation and impact between spatial modes, according to an embodiment of the present disclosure.

FIG. 3 illustrates crosstalk generation and impact between spatial modes, according to an embodiment of the present disclosure. A simple case is used here for FIG. 3, with 4 spatial modes and each mode having one wavelength channel ($\lambda_1$). Here we assume the wavelength isolation is perfect and limit our discussion for mode isolation. The data channels in 4 different spatial mode (same wavelength of $\lambda_1$) may be denoted by Ch1 312, Ch2 314, Ch3 316 and Ch4 318 as illustrated. The crosstalk (XT) generated from mode p and impacting mode q, may be denoted by XTpq, p, q=[1,2,3,4].

At the beginning, for example, at the transmitter side 302, the four mode data channels of Ch1 312, Ch2 314, Ch3 316, and Ch4 318 may be well isolated from each other as illustrated. Due to the imperfections of one or more of the mode MUX 320, mode DEMUX 330, and the MMF fiber 102, part of the light from each mode may leak into one or more of the other modes. For example, Ch1 312 may have part of light converted into one or more modes 2, 3 or 4, denoted as crosstalk terms of $XT_{12}$ 352, $XT_{13}$ 354 $XT_{14}$ 356. Similarly, Ch2 314 may have part of light converted into one or more mode 1, 3, or 4, denoted as $XT_{21}$ 362, $XT_{23}$ 364 and $XT_{24}$ 366 as illustrated. Similar patterns may be observed for Ch3 316 and Ch4 318 as illustrated.

At the receiver side 342, the mode DEMUX 330 may separates Ch1 312, Ch2 314, Ch3 316, and Ch4 318, into 4 output ports 336. First output port may observe Ch1 312 together with $XT_{21}$ 362, $XT_{31}$ 372 and $XT_{41}$ 382. Thus, Ch1 data may be "contaminated" by crosstalk $XT_{21}$ 362, $XT_{31}$ 372 and $XT_{41}$ 382, resulting in degraded bit error rate (BER). One approach to deal with such crosstalk may be to use massive multi-input-multi-output (MIMO) algorithm at the receiver end DSP, at a cost of high power consumption.

Another approach may be to monitor the crosstalk and have in-line adjustment to optimize the performance of MUX/DEMUX.

Embodiments may provide for using in-line optimization to minimize the crosstalk caused by imperfection of mode MUX/DEMUX. Minimizing crosstalk may improve the BER performance of MDM system and may reduce the required DSP complexity for MIMO processing.

In an embodiment, pilot tones may be used to monitor crosstalk and apply in-line tuning to optimize mode MUX and mode DEMUX. The process of using pilot tones for monitoring and in-line tuning for optimization of mode MUX and mode DEMUX may be referred to as feedback control. The pilot tone may be an additional amplitude or phase modulation on top of the data signal. As discussed, pilot tone may be used for additional monitoring and feedback control.

As discussed, mode MUX and DEMUX for spatial division multiplexing system may have imperfect performance partly due to fabrication errors, either by photonic integration-based components or by fiber-based ones. Embodiments may provide for in-line monitoring for mode-crosstalk. By monitoring the feedback signal, the MUX and DEMUX may be properly tuned to reduce the crosstalk caused by fabrication errors.

Accordingly, embodiments may obviate the need for using massive MIMO at Rx side DSP, and reduce or save power consumption. Further, embodiments may allow for increased system tolerance for fabrication error of mode MUX or DEMUX, which may further improve the yield.

Figure 4:
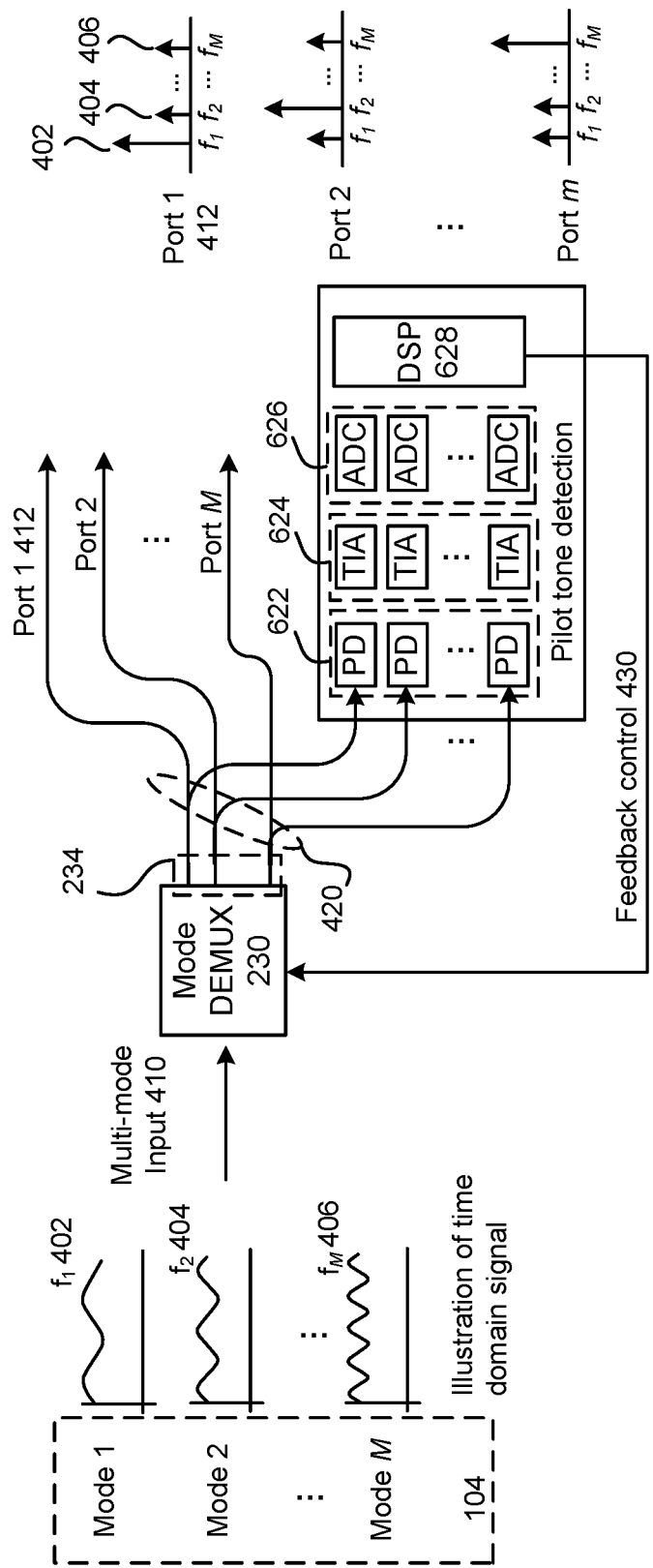
FIG. 4 illustrates pilot tone modulation at DEMUX side (receiver side), according to an embodiment of the present disclosure.

FIG. 4 illustrates pilot tone modulation at DEMUX side (receiver side), according to an embodiment of the present disclosure.

As illustrated, the amplitudes of the data channels (for example channels 106) in different spatial modes 104 (mode I to mode M) may be modulated with different frequencies of sinusoidal pilot tones (labeled by frequencies of $f_1$ 402, $f_2$ 404~$f_M$ 406). At the DEMUX side, the input multi-mode optical signal 410 may be spatially de-multiplexed (converted into fundamental mode and conducted to different output ports 234). The output signals (including the pilot tones) may be partially tapped at 420 and detected via one or more photodetectors (PDs) 622.

The electrical outputs of detectors may then be amplified by, for example, transimpedance amplifiers (TIAs) 624 and then sampled by low sampling rate ADCs 626. The sampled signals may then be processed by a DSP unit 628 for optimization iteration.

After detection, the power of pilot signals with different frequencies may be extracted. Theoretically, the pilot tones of $f_2$ 404~$f_M$ 406 (which are treated as undesired tones) should not be seen at port 1 412. However, if the DEMUX 230 is not perfect, the undesired tones of $f_2$ 404~$f_M$ 406 may be seen at port 1 412 as illustrated, although $f_1$ 402 may be seen with a higher power. Based on the monitored power of undesired tones, a tuning voltage may be applied, via feedback control 430 to the DEMUX 230. The tuning voltage may be applied to reduce or minimize the powers of undesired tones $f_2$ 404~$f_M$ 406 at port 1 412. A person skilled in the art may appreciate that upon minimizing the powers of undesired tones ($f_2$ 404~$f_M$ 406) at port 1 412, the crosstalk at port 1 412 may also be minimized. There may be various ways for tuning the DEMUX 230 for minimizing power of the undesired tones as may be appreciated by a person skilled in the art. Elements that may be used to tune a mode DEMUX or mode MUX may include, among others, internal phase shifter, attenuator, delay, etc.

Similar principles or applications for minimizing the undesired tones at port 1 may be applied to the rest of the output ports 234 (ports 2~M) of the mode DEMUX 230.

Figure 5:
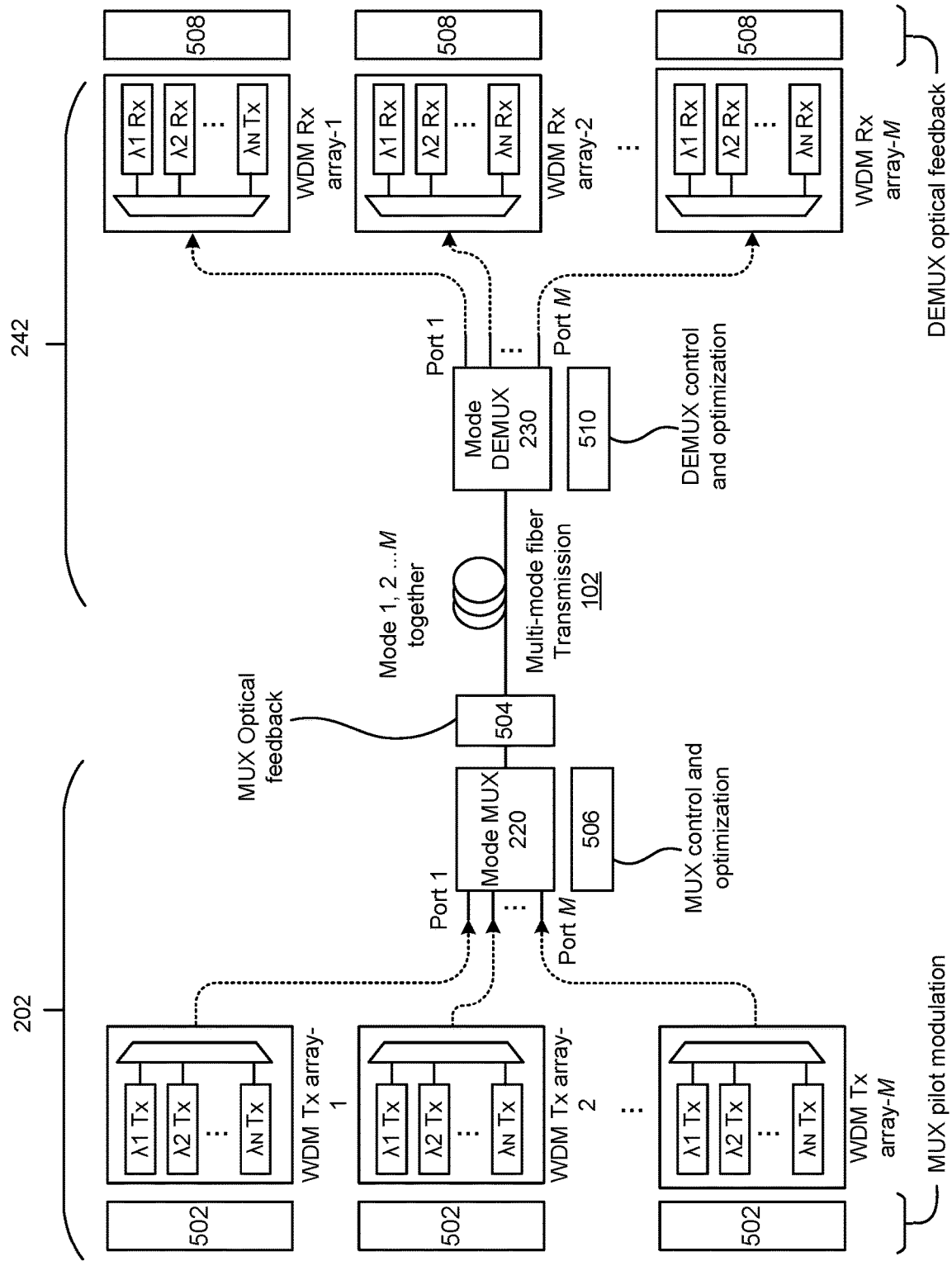
FIG. 5 illustrates pilot tone based feedback control, according to an embodiment of the present disclosure.

FIG. 5 illustrates pilot tone based feedback control, according to an embodiment of the present disclosure. The pilot tone based feedback control may comprise 5 modules for realizing feedback control functions. Modules 502, 504 and 506 may relate to the transmitter side 202 (or MUX side) of the MDM system 200. Module 502 (which may be referred to as MUX pilot modulation component) may be configured to realize the pilot tone modulation. Module 504 (which may be referred to as MUX optical feedback component) may be configured to extract part of the light containing pilot tones signals. The pilot tone signals may be used for monitoring as discussed herein. Module 506 (which may be referred to as MUX pilot detection and control circuit component or MUX control and optimization component) may be configured to detect the extracted light and apply a tuning voltage to the MUX 220.

Modules 508 and 510 may relate to the receiving side 242 or DEMUX side. Module 508 (which may be referred to as DEMUX optical feedback component) may be configured to extract part of the light containing pilot tones. Module 510 (which may be referred to as DEMUX pilot detection and control circuit component or DEMUX control and optimization component) may be configured to perform one or more of detecting and monitoring the extracted pilot tones. Module 510 may further be configured to apply tuning voltage to the DEMUX to minimize undesired tone power as discussed herein.

Embodiments will now further describe the pilot tone based feedback control for each of the transmitter side 202 (or MUX side) and the receiver side 242 (or DEMUX side).

Figure 6A:
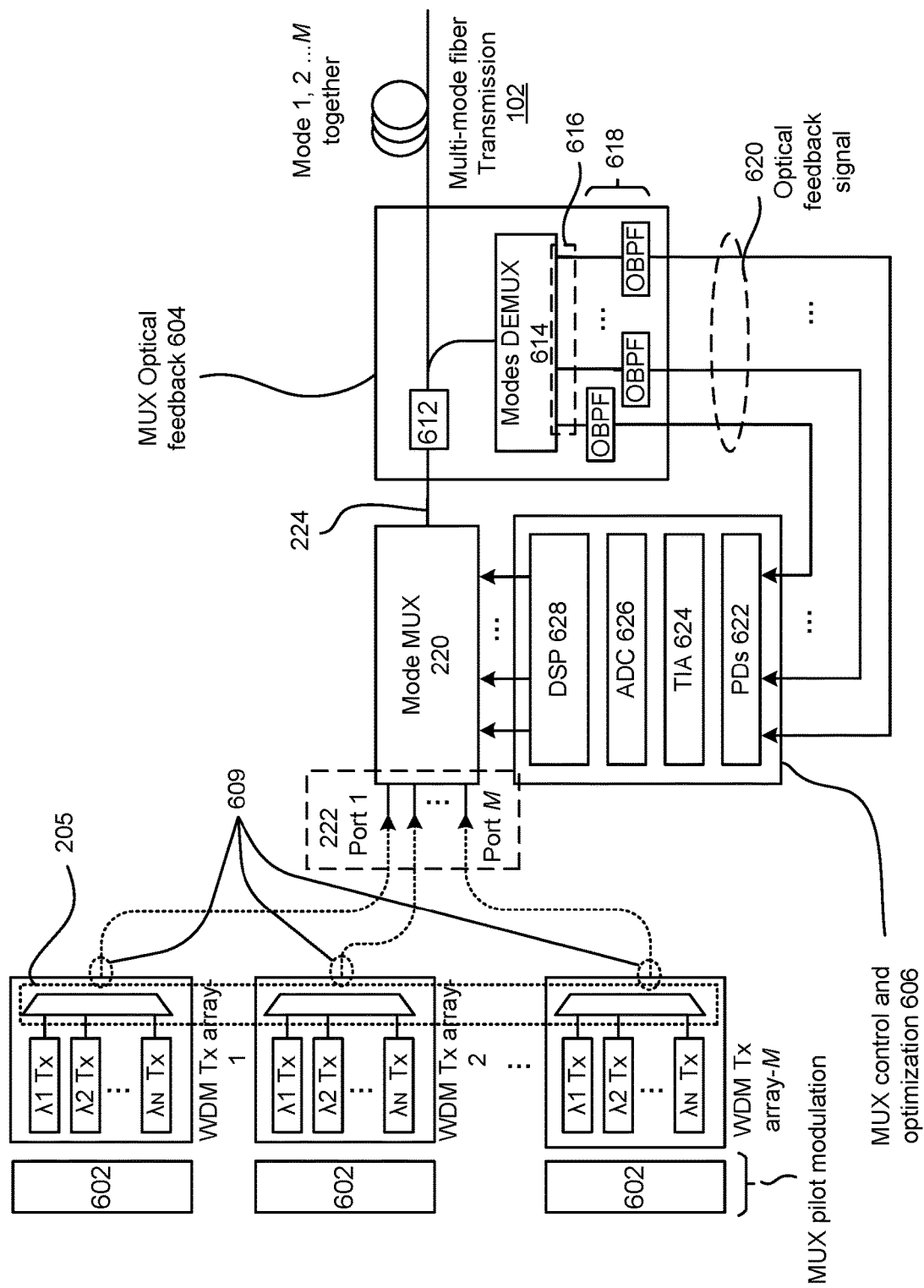
FIG. 6A illustrates MUX side feedback control, according to an embodiment of the present disclosure.

FIG. 6A illustrates MUX side feedback control, according to an embodiment of the present disclosure. FIG. 6A illustrates an embodiment for pilot signal modulation, detection and control at mode MUX side. The MUX side feedback control may comprise a MUX pilot modulation part (module 602), an optical feedback part (module 604), and a control circuits part or a control and optimization module (module 606).

Module 602 (MUX pilot modulation component), which may be functionally similar to module 502, may be implemented by, for example, a Transmitter-DSP (Tx-DSP) or a modulator bias dither, for generating pilot tones as discussed. The pilot tones may have frequencies ranging from $f_1$ to $f_M$, (for example $f_1$ 402~$f_M$ 406 as described in reference to FIG. 4) for spatial channel 1 to M respectively, as spatial mode labels. In other embodiments, the MUX pilot modulation component 602 may be realized at the output 609 of the WDM MUX 205, or at each input port 222 of the mode MUX 220.

Module 604, which may be functionally similar to module 504, may be applied at the output 224 of the mode MUX 220 as illustrated. At the output 224 of the mode MUX 220, a multi-mode coupler 612 may be configured to tap the multi-mode optical signal. The tapped multi-mode optical signal may feed a TX side mode DEMUX 614. Light (WDM signal) from each output port 616 may be in fundamental node as described herein. Light from each output port 616 of mode DEMUX 614 (Tx side) may be filtered by an optical bandpass filter 618 for better signal-to-noise ratio (SNR). The filtered light may then be used as optical feedback signal 620, from where the pilot tone signals may be extracted.

Module 606, which may be functionally similar to module 506, may process the optical feedback signal 620 for optimization control purposes. The optical feedback signal 620 may be detected by, for example, low speed photodetectors (PDs) 622. The electrical outputs of detectors may then be amplified by, for example, transimpedance amplifiers (TIAs) 624 and then sampled by low sampling rate ADCs 626. The sampled signals may then be processed by a DSP unit 628 for optimization iteration.

In the first iteration, the DSP unit 628 may process the raw data to extract the power of each pilot tone. Then, the DSP unit 628 may apply, based on the extracted power of the pilot tones, a tuning voltage to the mode MUX 220. The applied tuning voltage may, accordingly, change (i.e., reduce) the powers of detected undesired pilot tones. In the following iterations, the ADCs 626 may capture the optical feedback signal after each tuning of voltage applied to the mode MUX 220. Based on the power change of undesired tones, the DSP unit 628 may apply a search algorithm to minimize the power of undesired pilot tones, i.e., the optimized state for mode MUX 220. Upon application of the search algorithm, the crosstalk caused by defects, for example in mode MUX 220, may then be reduced or minimized.

According to embodiments, the mode crosstalk which may be caused by an imperfect mode MUX may be reduced, contributing to a better BER for each spatial mode 104.

Figure 6B:
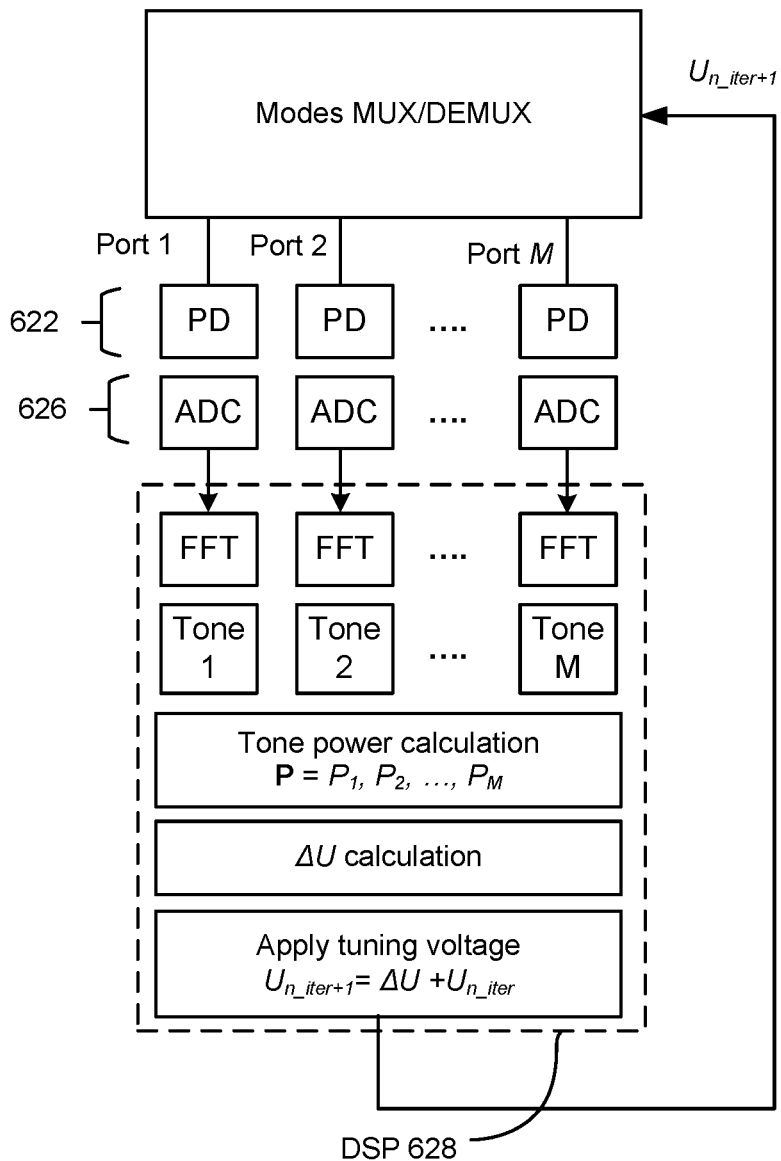
FIG. 6B illustrates a digital signal processing (DSP) function, according to an embodiment of the present disclosure.

FIG. 6B illustrates a DSP function, according to an embodiment of the present disclosure. As may be appreciated by a person skilled in the art, the DSP function in FIG. 6B may apply to both MUX and DEMUX.

At the output port of mode MUX/DEMUX, optical signal of each path may be tapped to feed a photodetector 622 for O/E conversion (as illustrated in FIG. 6B and further described below). The electrical output from each PD 622 may be sampled by an ADC 626 to digitalize the feedback signal. The requirement of analogy bandwidth for ADC 626 and photodetector 622 may be greater than the highest frequency of the pilot tone signals (e.g., $f_M$, which may be the highest frequency of the pilot-tone signals), so that all the pilot tone signals can be seen at each path. The ADC sampling rate, $f_s$, may be $\geq 2f_M$ to avoid sampling aliasing. After digitization, take m-th (m ∈ [1, M]) spatial channel path as an example, the sampled time domain signal $i_m(n)$ (wherein n is the index of discrete time domain sequence) may be converted into frequency domain by applying Fast Fourier Transform (FFT) operation. Here we may indicate the frequency domain signal by $I_m(f)$. For each m, m ∈ [1, M], $I_m(f)$ may include power information of all M pilot tones.

To calculate the power of k-th pilot tone contained in $I_m(f)$, k, m ∈ [1, M], we may integrate the power over a frequency window that equals to or less than pilot tone spacing, $f_D$, centered at $f_k$, as follows:

$$P_m(k) = \int_{f_k-f_D/2}^{f_k+f_D/2} |I_m(f)|^2 df$$

For all these sampled M spatial channels, we may write the received pilot tone power matrix as follows:

$$P = \begin{bmatrix} P_1(1) & P_2(1) & \ldots & P_m(1) & \ldots & P_M(1) \\ P_1(2) & P_2(2) & \ldots & P_m(k) & \ldots & P_M(2) \\ \vdots & \vdots & \vdots & \ddots & \vdots \\ P_1(M) & P_2(M) & \ldots & P_m(M) & \ldots & P_M(M) \end{bmatrix}$$

In power matrix P, the m-th column vector indicates pilot tone power measured at port m, m ∈ [1, M]. As may be appreciated by a person skilled in the art, ideally, the power matrix P should be an identity matrix. However, once mode crosstalk occurs, the off-diagonal elements of P become non-zero.

The purpose of control optimization algorithm is to apply suitable control voltage to the DEMUX, which may minimize the off-diagonal elements of P, so that the overall crosstalk performance can be minimized. The summation of all the off-diagonal elements of P is defined as $P_{feed}$.

The control voltage signal may be represented as follows:

$$U=[u_1 u_2 \ldots u_L],$$

$$u_l \in [-V_{max}, V_{max}], l=[1, \ldots, L]$$

The control voltage U may comprise L element. In an embodiment in which there may be C control signals for each port, then L=C M.

The captured power matrix P may be used to calculate the increment of control voltage signal, ΔU. A person skilled in the art may appreciate that various global optimum algorithms may be used or applied to obtain ΔU, for minimizing the off-diagonal elements of P. Some optimum algorithms that may be used include gradient search, hill climbing, simulated annealing, genetic algorithm, particle swarm optimization (PSO), etc.

Figure 6C:
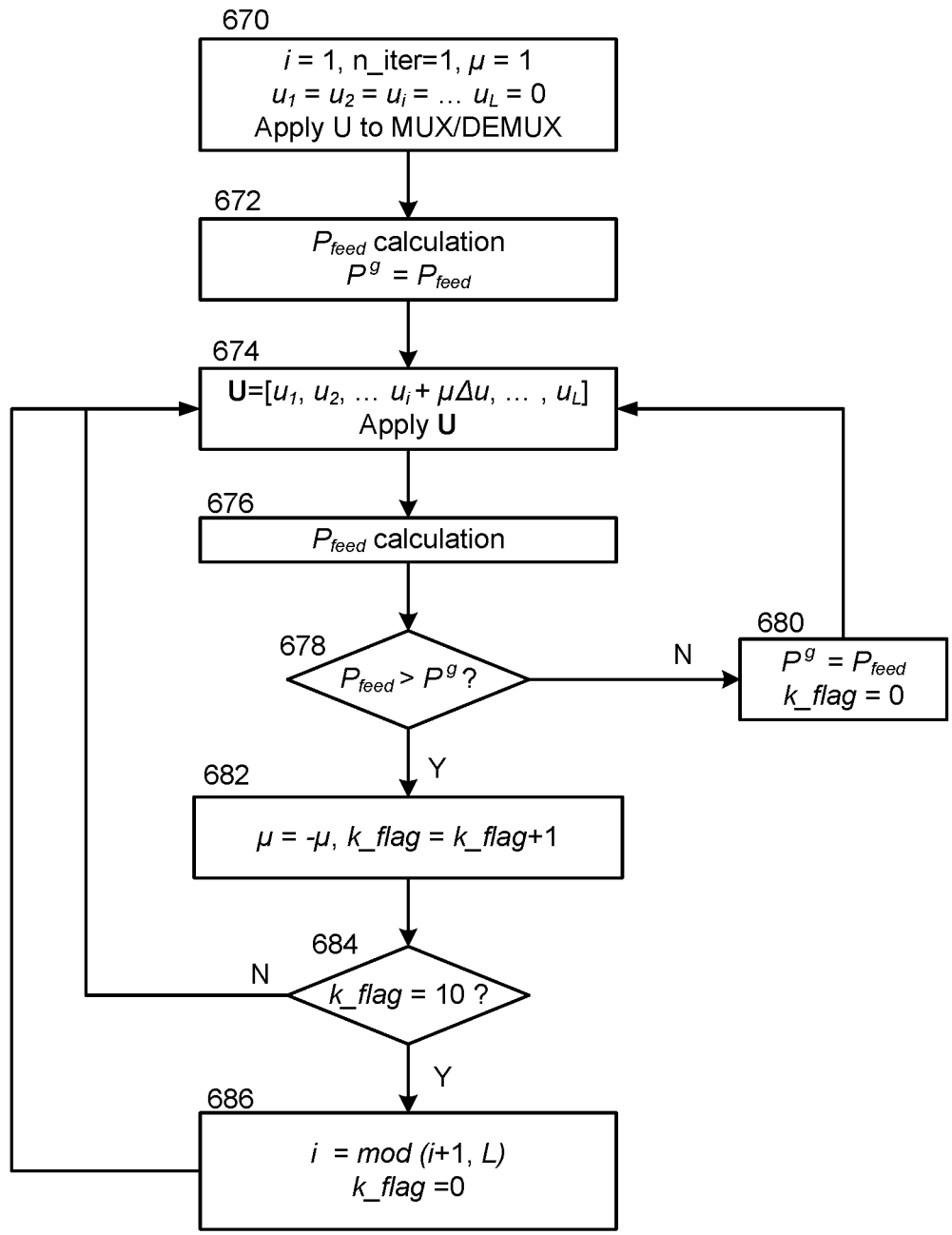
FIG. 6C illustrates a flow chart of a hill climbing algorithm, according to an embodiment of the present disclosure.

In an embodiment, a hill climbing algorithm may be used to obtain ΔU. FIG. 6C illustrates a flow chart of a hill climbing algorithm, according to an embodiment of the present disclosure.

At the beginning, e.g., at 670, some parameters may be initialized as follows. The dither index i may be set to be 1, iteration index n_iter may be set to 1, sign control μ may be set to 1, minimum control index k_flag is may be set to 0. $U_{n\_iter}$ may also initialized by setting $u_1 = u_2 = \ldots = u_L = 0$, i.e., $$U_{n\_iter}=[0,0,0, \ldots 0]$$

In the first iteration (n_iter=1), after applying the voltage, $U_{n\_iter}$, the detection circuits may obtain and record, at 672, a first feedback signal power $P_{feed}$. The global optimum $p^g$ may be temporarily set to $P_{feed}$.

In the second iteration (n_iter=2), at 674*m* $u_i$ may be increased by a step of $$\Delta u = \mu \frac{2V_{max}}{N_1}, \text{ i.e., } U_{n\_iter+1} = U_{n\_iter} + \Delta U = \left[\mu \frac{2V_{max}}{N_1}, 0, 0, \ldots 0\right].$$

After apply tuning voltage, at 675, the feedback control signal power $P_{feed}$ may be calculated based on newly obtained pilot tone power matrix P. At 678, if $P_{feed} < p^g$, $p^g$ may be updated, at 680, by setting $p^g = P_{feed}$, and the minimum control flag k_flag may be set to 0. If $P_{feed} > p^g$, which may indicate that the applied control voltage in second iteration does not reduce crosstalk. Then in next iteration (n=3), at 682, the control voltage may be decreased by one step, e.g., by setting $\mu = -\mu$, and the minimum control flag k_flag may be increased by 1. If in the next iterations, the calculated $p_{feed}$ is determined to be $P_{feed} > p^g$, minimum control flag k_flag may continue to increase. In an embodiment, the threshold k_flag may be set to 10, at 682, such that once the threshold is passed, the algorithm may start to calibrate the second voltage of $u_2$, at 686, by setting i=2 in next iteration.

As may be appreciated by a person skilled in the art, the control circuits may continue to iterate. During these iterations, all control units may be optimized. The algorithm may keep a small dithering around the optimum control voltage unit. The algorithm may keep track of the power of pilot tones as crosstalk fluctuates (increase or decrease) over the iterations. Accordingly, the MUX/DEMUX may be locked at its optimum performance.

As discussed, another algorithm that may be used to obtain $\Delta U$ may be the Particle swarm optimization (PSO) algorithm. The PSO is a well-known global optimization algorithm, that may be efficiently applied in this case. The PSO based control voltage optimization may be governed by the below equations;

$$U_{n\_iter+1}^{i'} = U_{n\_iter}^{i'} + v_{n\_iter}^{i'}$$

$$v_{n\_iter+1}^{i'} = v_{n\_iter}^{i'} + c_1 r_1 (p_{n\_iter}^{i'} - U_{n\_iter}^{i'}) + c_2 r_2 (p_{n\_iter}^{g} - U_{n\_iter}^{i'})$$

Where the $U_{n\_iter}^{i'}$ may be the i'-th particle (or the i'th group of randomly initialized control voltage) at n_iter-th iteration. In an embodiment, we may have a total of I particles as the whole swam for optimization, i.e., i' ∈ [1, I]. Accordingly, $U_{n\_iter+1}^{i'}$ may be the next updated control voltage for the i'th particle. $v_{n\_iter}^{i'}$ may be the update rate for the i'th particle at n_iterth iteration. $p_{n\_iter}^{i'}$ may represent the best feedback power of particle i', at iteration n_iter, with $p_{n\_iter}^{g}$ representing the global best position in the swam. $r_1$ and $r_2$ may be uniform random numbers ranging from 0 to 1. $c_1$ and $c_2$ may be set to 2. The $p_{n\_iter}^{i'}$ and $p_{n\_iter}^{g}$ may be updated according to newly obtained $P_{feed}$. After sufficient iteration, $p_{n\_iter}^{g}$ may become stable, and the corresponding $U^*_{n\_iter}$ may be the optimum control voltage.

After determining the optimum control voltage, only the optimum particle may continue to update, and the algorithm may go into tracking mode. Similar to the hill climbing algorithm, the PSO algorithm may keep a small dithering around the optimum control voltage unit. The PSO algorithm may keep track of the power of pilot tones as crosstalk fluctuates (increase or decrease). Accordingly, the MUX/DEMUX may be locked at its optimum performance.

Figure 7:
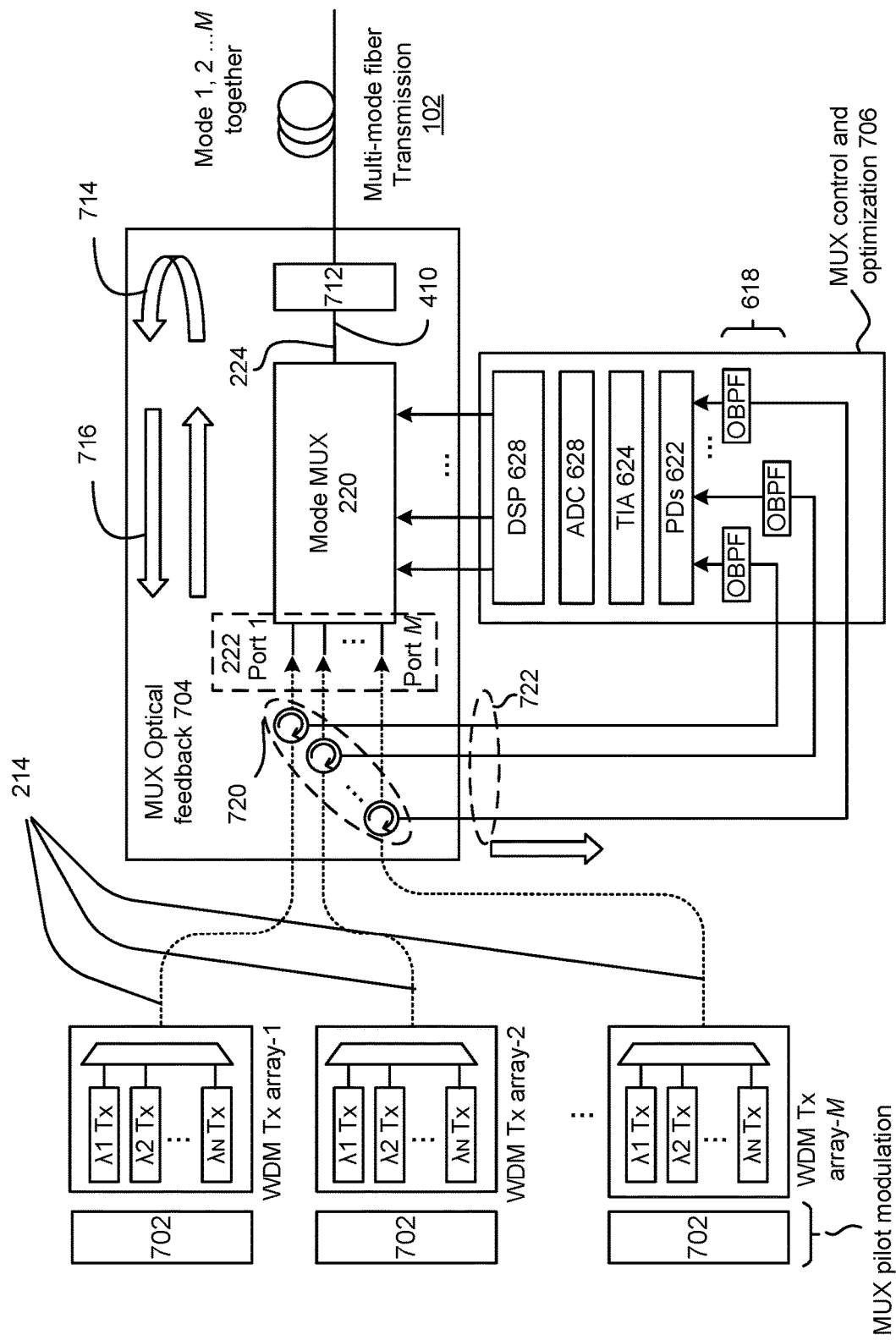
FIG. 7 illustrates another MUX side feedback control, according to an embodiment of the present disclosure.

FIG. 7 illustrates another MUX side feedback control, according to an embodiment of the present disclosure. The MUX side feedback control of FIG. 7 may be based on reflected optical signals, as described herein.

The MUX side feedback control may comprise a pilot modulation component 702, an optical feedback component 704, and a control and optimization component 706.

The pilot modulation component 702, which may functionally similar to module 502, may be similar to the pilot modulation component 602. The pilot modulation component 702 may be implemented by, for example, a Tx-DSP or a modulator bias dither for introducing frequency tone in amplitude or phase for each spatial channel. As discussed herein, the mode MUX 220 may then transfers the input WDM signals 214 into different mode and combine them together at the output.

The optical feedback component 704, which may be functionally similar to module 504, may comprise a partial reflector 712 placed at the output 224 of the mode MUX 220. The partial reflector 712 may partially reflect back 714 the multi-mode output signal 410 and propagate backwards through the mode MUX 220. The partially reflected light 716 may see the mode MUX 220 as a mode DEMUX. As may be appreciated by a person skilled in the art, mathematically, the frequency domain transmission channel matrix of the mode MUX 220 may be $H_{mux}$. Accordingly, the reflected signal 716 may see a double pass channel matrix of $H_D = H_{mux} H_{mux}^H$, where the subscript H may denote complex conjugate. At each input port 222 of the mode MUX, an optical circulator 720 may be used to tap the reflected light. As discussed, theoretically, if the mode MUX 220 performs perfectly (i.e., does not generate crosstalk), the reflected optical light 716 at each input port 222 may not include the pilot tones modulations applied at other input ports.

At the MUX control and optimization module 706, which may be functionally similar to 506, the tapped light 722 (comprising the pilot tones) at each input port 222 of mode MUX 220 may be filtered by an OBPF 618 to improve SNR, and then detected by PDs 622. The output electrical signal of PDs 622 may then be amplified by TIAs 624 and sampled by ADCs 626. A DSP unit 628 may then process the sampled signals to extract the intensity of pilot tones for each port 222.

The optimization procedure for FIG. 7 may be similar to the optimization procedure described in reference to FIG. 6A-6C. The DSP unit 628 may apply a tuning voltage to the mode MUX 220. The MUX side feedback control system may perform another feedback signal capture, in the next iteration, to determine the variance or changes in the power of the extracted pilot tones (undesired pilot tones). The DSP unit 628 may then apply a search algorithm in following iterations, as described herein, to reduce the power of the undesired pilot tones, and thereby optimize the mode MUX 220.

Accordingly, the embodiment described in reference to FIG. 7 may provide for a more compact implementation for MUX side feedback control, since no additional mode DEMUX is required (as in FIG. 6A) to be deployed at Tx side 202.

As may be appreciated by a person skilled in the art, the pilot tone modulation may be applied by coherent digital signal processing (DSP) at the transmitter. In some embodiments the pilot tone modulation may be realized by a modulator bias. In other embodiments, the pilot tone modulation may be realized by additional modulator at the input port of the Mode MUX. A person skilled in the art may appreciate that the pilot tone modulation may be realized via other methods.

Figure 8A:
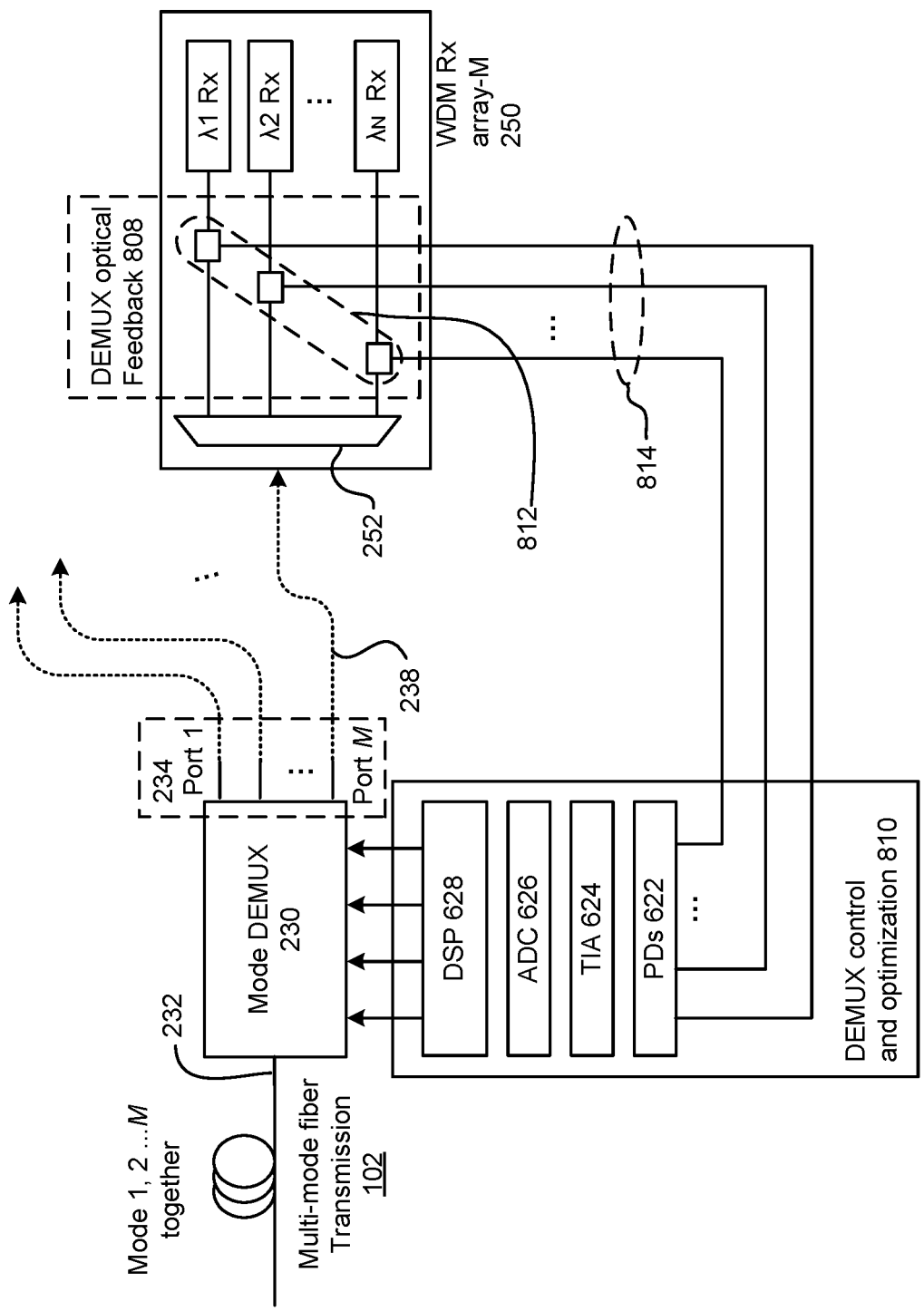
FIG. 8A illustrates DEMUX side feedback control, according to an embodiment of the present disclosure.
Figure 8B:
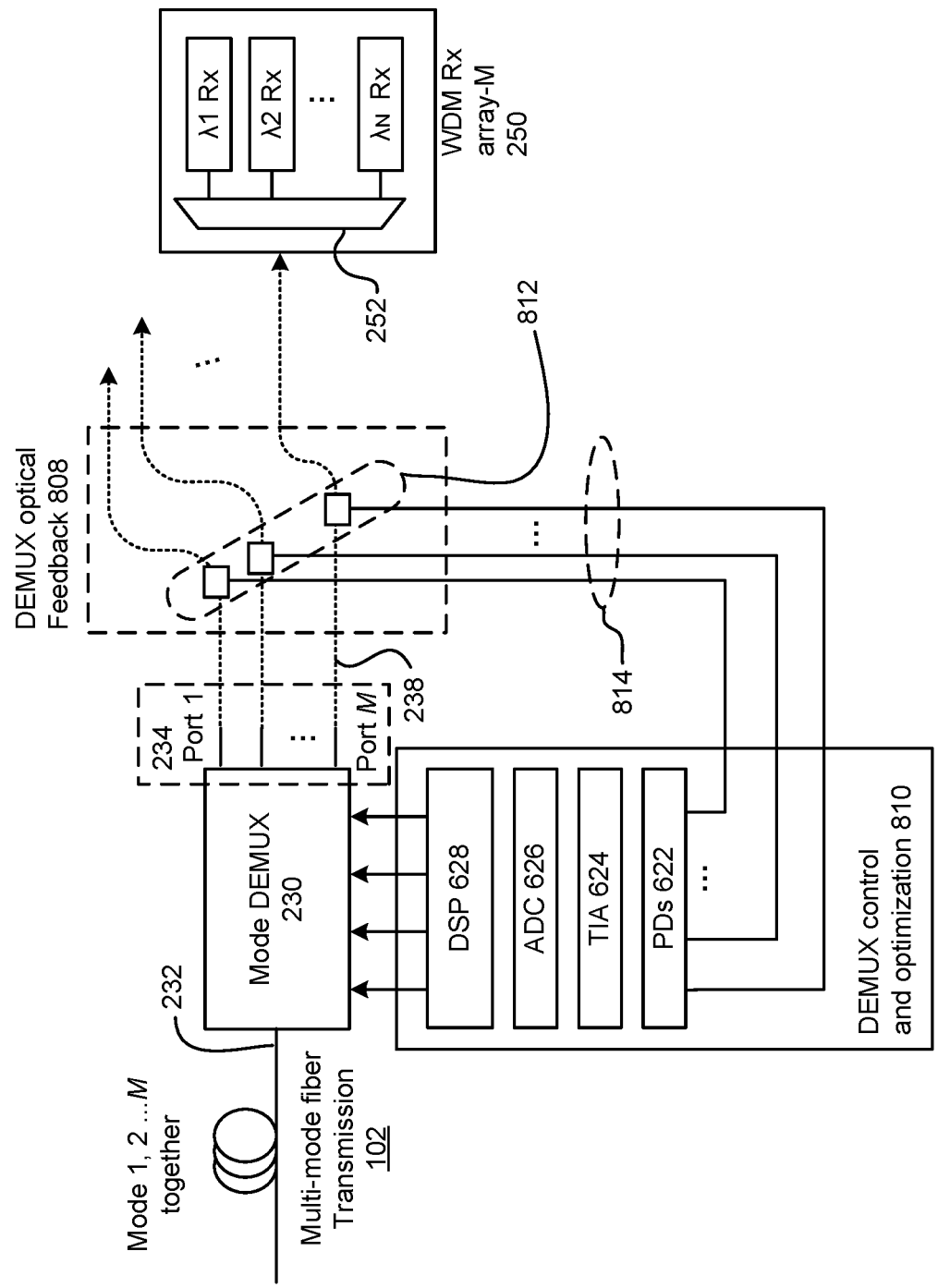
FIG. 8B illustrates another DEMUX side feedback control, according to an embodiment of the present disclosure.

FIG. 8A illustrates DEMUX side feedback control, according to an embodiment of the present disclosure. FIG. 8B illustrates another DEMUX side feedback control, according to an embodiment of the present disclosure.

Referring to FIGS. 8A and 8B, the DEMUX side feedback control may comprise an optical feedback component 808 (which may be functionally similar to module 508) and a control and optimization component 810 (which may be functionally similar to module 510).

As discussed, the multi-mode signal may be carried by the MMF 102 and sent to the input 232 of mode DEMUX 230. The signal light from different spatial mode 104 may carry different pilot tones as described herein. The mode DEMUX 230 may convert m-th light from m-th order of spatial modes to fundamental mode and send each de-multiplexed WDM signal (in fundamental mode) to a corresponding output port 234 of mode DEMUX 230.

Referring to FIG. 8A, each output may connect to a wavelength-DEMUX to further separate each data channel (for example, the M-th spatially de-multiplexed WDM signal 238 may go through the WDM DEMUX 252 of the WDM Rx array-M 250).

The DEMUX optical feedback component 808 may comprise single mode tap couplers 812, placed after the wavelength DEMUX, for example, single mode tap couplers 812 may be placed after wavelength DEMUX 252 of the WDM Rx array-M 250. The single mode tap couplers 812 may tap part of the light exiting each port (i.e., for each data channel) of the wavelength DEMUX 252, as optical feedback signals.

Although the pilot tones may be tapped at the output of wavelength DEMUX in optical feedback component 808, a person skilled in the art may appreciate that, in other embodiments, pilot tones may be tapped at the output of mode DEMUX 230, for example, as illustrated in FIG. 8B. Referring to FIG. 8B, the DEMUX optical feedback 808 is positioned after the outports 234 and before the wavelength-DEMUX (e.g., WDM DEMUX 252 of the WDM Rx array-M 250). In FIG. 8B, the single mode tap couplers 812 may tap part of light at output port 234 of the DEMUX 230 as illustrated. The tapped light 814 may be sent as optical feedback signal to DEMUX control and optimization 810.

Referring to FIG. 8A and FIG. 8B, the tapped lights are sent to DEMUX control and optimization component 810. The tapped light 814 may be sent to PDs 622 for optical to electrical (O/E) conversion. The output of the detectors 622 may be amplified by TIAs 624 and sampled by ADCs 626. A DSP unit 628 may be configured to process the sampled signal to extract the power of pilot tones. The optimization procedure, for optimizing the mode DEMUX 230, may be similar to the optimization procedure described in reference to FIG. 6A-6C, which include adjusting or tuning the control voltage of mode DEMUX 230 to minimize the power of undesired pilot tones as described herein.

Accordingly, the embodiment described in reference to FIG. 8A and FIG. 8B may allow for improving DEMUX side performance by reducing crosstalk.

Figure 9:
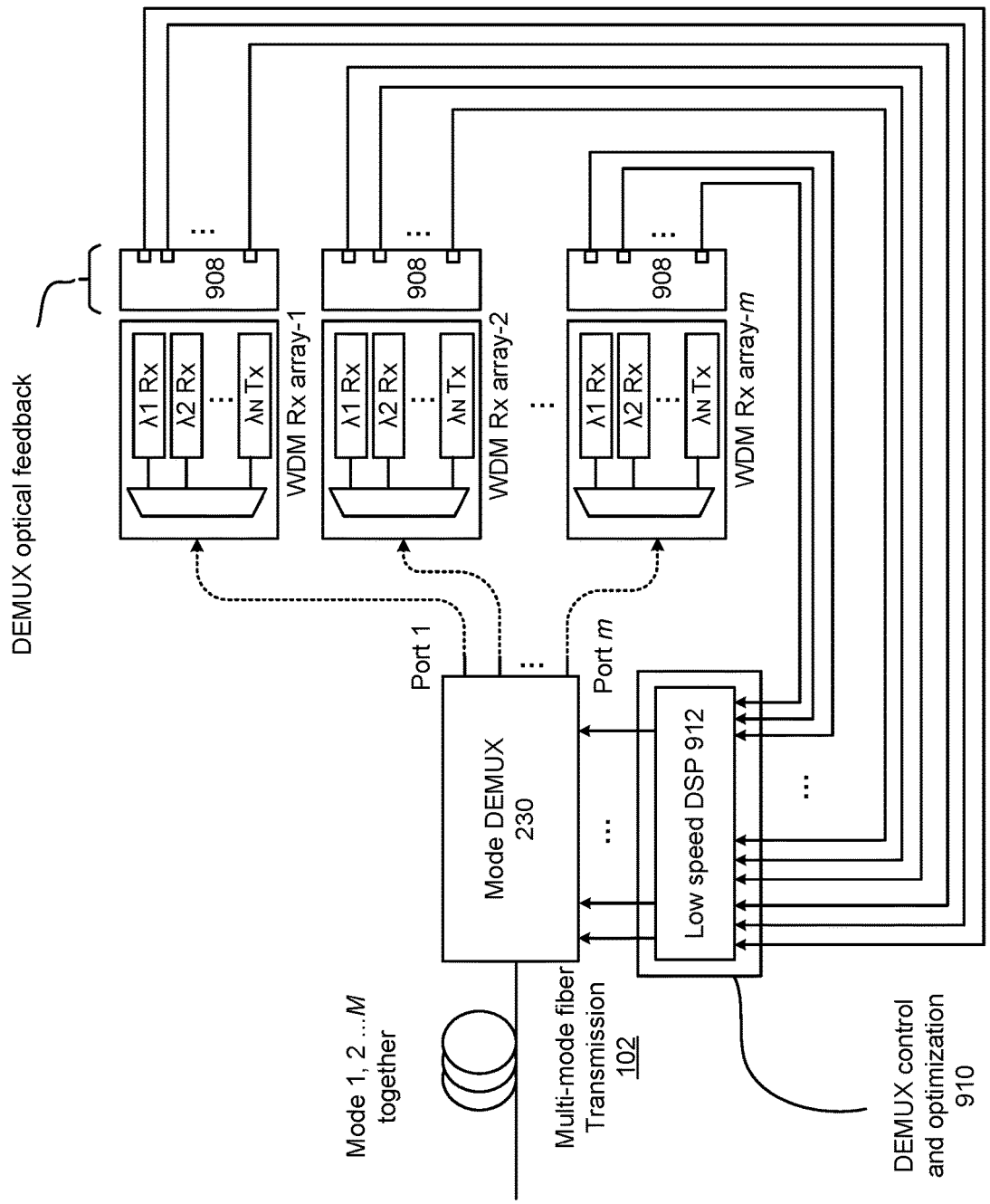
FIG. 9 illustrates another DEMUX side feedback control, according to an embodiment of the present disclosure.

FIG. 9 illustrates another DEMUX side feedback control, according to an embodiment of the present disclosure. The DEMUX side optical feedback of FIG. 9 may comprise a DEMUX optical feedback component 908 (which may be functionally similar to the DEMUX optical feedback component 508) and a DEMUX control and optimization component 910 (which may be functionally similar to the DEMUX control and optimization component 510).

The DEMUX optical feedback component 908 may comprise one or more coherent receivers, such that after mode DEMUX 230 and wavelength DEMUX, each wavelength data channels may be received by the one or more coherent receiver.

Each coherent receiver may capture all the information (polarization, amplitude, and phase) from the optical light. Each coherent receiver may comprise a DSP unit for extracting the power of pilot tones from coherently detected signals. The DSP unit in the coherent receiver may report the monitored power values to control and optimization component 910.

The control and optimization component 910 may comprise a low-speed DSP unit for receiving the reported monitored power values from the coherent receiver. The low-speed DSP unit 912 may implement the search algorithm for optimizing the mode DEMUX 230 similar to the optimization procedure described in reference to FIG. 6A-6C, which include adjusting or tuning the control voltage of mode DEMUX 230 to minimize the power of undesired pilot tones at each receiver as described herein.

A person skilled in the art may appreciate that the embodiment described in reference to FIG. 9 may allow for using coherent receiver (and coherent DSP module) for obviating the additional optical components that may be needed for pilot tone extraction.

Embodiments described herein may allow for using pilot tone-based feedback control scheme for mode MUX and mode DEMUX in-line optimization.

Figure 10:
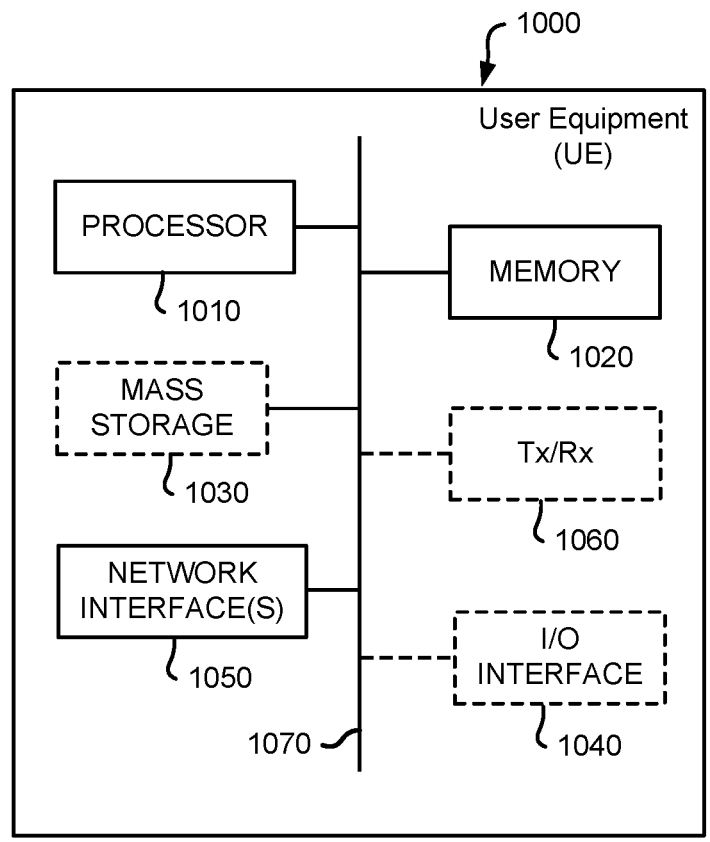
FIG. 10 is a user equipment (UE) that may perform any or all of operations of the above methods and features explicitly or implicitly described herein, according to different embodiments of the present disclosure.

FIG. 10 is a user equipment (UE) that may perform any or all of operations of the above methods and features explicitly or implicitly described herein, according to different embodiments of the present disclosure. For example, a computer equipped with network function may be configured as UE 1000.

As shown, the UE 1000 may include a processor 1010, such as a Central Processing Unit (CPU) or specialized processors such as a Graphics Processing Unit (GPU) or other such processor unit, memory 1020, non-transitory mass storage 1030, input-output interface 1040, network interface 1050, and a transceiver 1060, all of which are communicatively coupled via bi-directional bus 1070. According to certain embodiments, any or all of the depicted elements may be utilized, or only a subset of the elements. Further, UE 1000 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1020 may include any type of non-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method operations described above.

Figure 11:
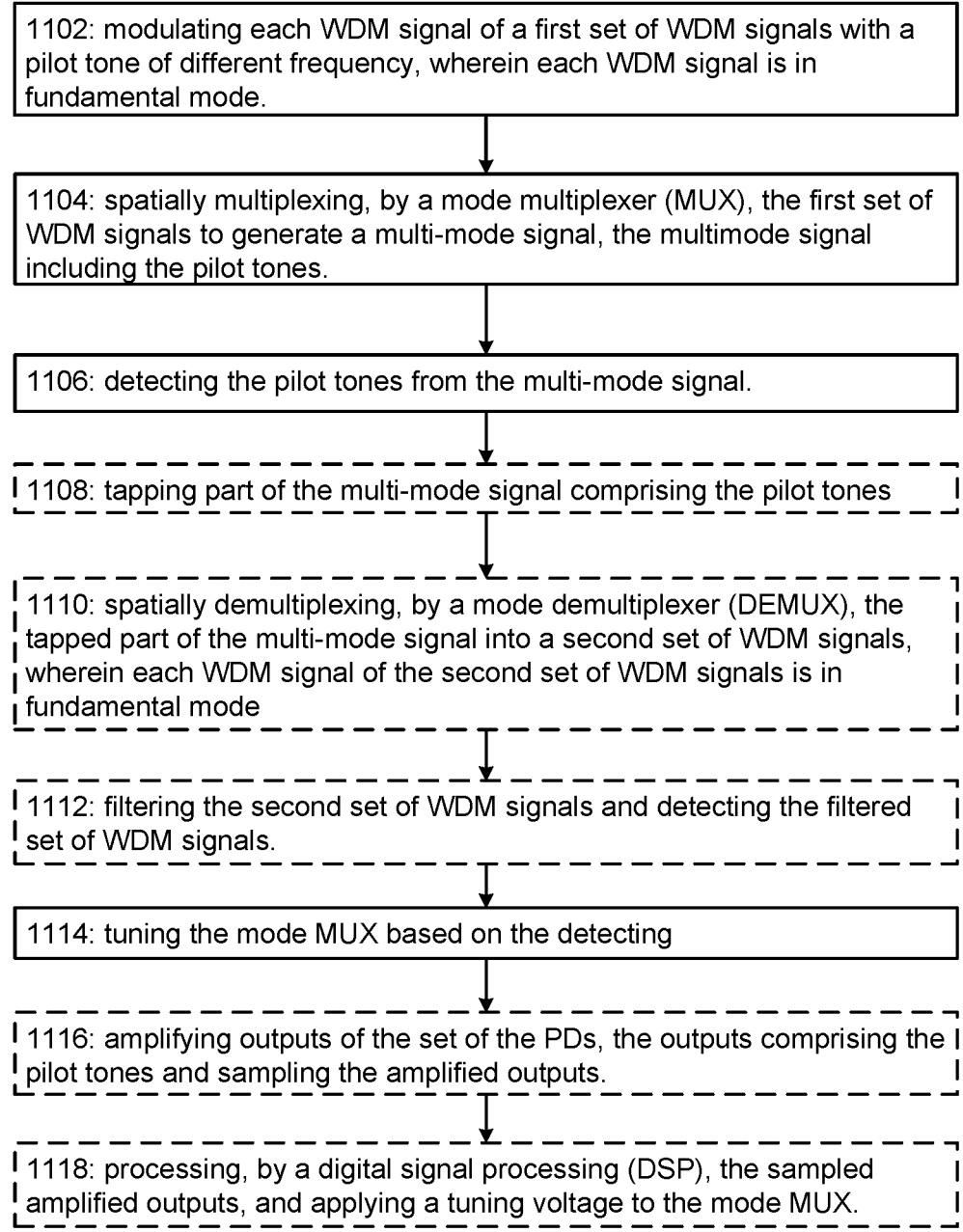
FIG. 11 illustrates a method of optimizing a mode MUX, according to an embodiment of the present disclosure.

FIG. 11 illustrates a method of optimizing a mode MUX, according to an embodiment of the present disclosure.

The Method 1100 may include, at 1102, modulating each WDM signal of a first set of WDM signals with a pilot tone of different frequency, wherein each WDM signal is in fundamental mode. In some embodiments, the modulating each WDM signal includes modulating each data channel of each WDM signal with a pilot tone of different frequency.

The method may further include, at 1104, spatially multiplexing, by a mode multiplexer (MUX), the first set of WDM signals to generate a multi-mode signal, the multi-mode signal including the pilot tones. The method may further include, at 1106, detecting the pilot tones from the multi-mode signal. The method may further include, at 1114, tuning the mode MUX based on the detecting.

In some embodiments, the detecting may include, at 1108, tapping part of the multi-mode signal comprising the pilot tones. In some embodiments, the tapping may include tapping, by a multi-mode coupler, part of the multi-mode signal, the multi-mode coupler placed at the output of the mode MUX. In some embodiments, the tapping may include reflecting, by a partial reflector, part of the multi-mode signal, the partial reflector placed at the output of the mode MUX. In some embodiments, the tapping may include tapping, by a set of optical circulators, the second set of WDM signals.

In some embodiments, the detecting may further include, at 1110, spatially demultiplexing, by a mode demultiplexer (DEMUX), the tapped part of the multi-mode signal into a second set of WDM signals, wherein each WDM signal of the second set of WDM signals is in fundamental mode. In some embodiments, the spatially demultiplexing includes spatially demultiplexing, by the mode DEMUX, the reflected part of the multi-mode signal into the second set of WDM signals, wherein each WDM signal of the second set of WDM signals is in fundamental modes.

In some embodiments, the detecting may further include, at 1112, filtering, by a set of optical bandpass filter (OBPF), the second set of WDM signals. In some embodiments, the detecting may further include detecting, by a set of photodetectors (PDs), the filtered set of WDM signals.

In some embodiments, the tuning may include, at 1116, amplifying, by a set of transimpedance amplifiers, outputs of the set of the PDs, the outputs comprising the pilot tones. In some embodiments, the tuning may further include sampling, by a set of analog to digital convertors (ADCs), the amplified outputs. In some embodiments, the tuning may further include, at 1118 processing, by a digital signal processing (DSP), the sampled amplified outputs. In some embodiments, the tuning may further include applying, by the DSP, a tuning voltage to the mode MXU based on the processing.

In some embodiments, the processing includes determining power level of each pilot tone. In some embodiments, the mode DEMUX is the mode MUX in reverse.

In some embodiments, the method may further include further processing change in power level of the pilot tones after applying the tuning voltage. In some embodiments, the method may further include applying, by the DSP, a search algorithm based on the further processing.

Figure 12:
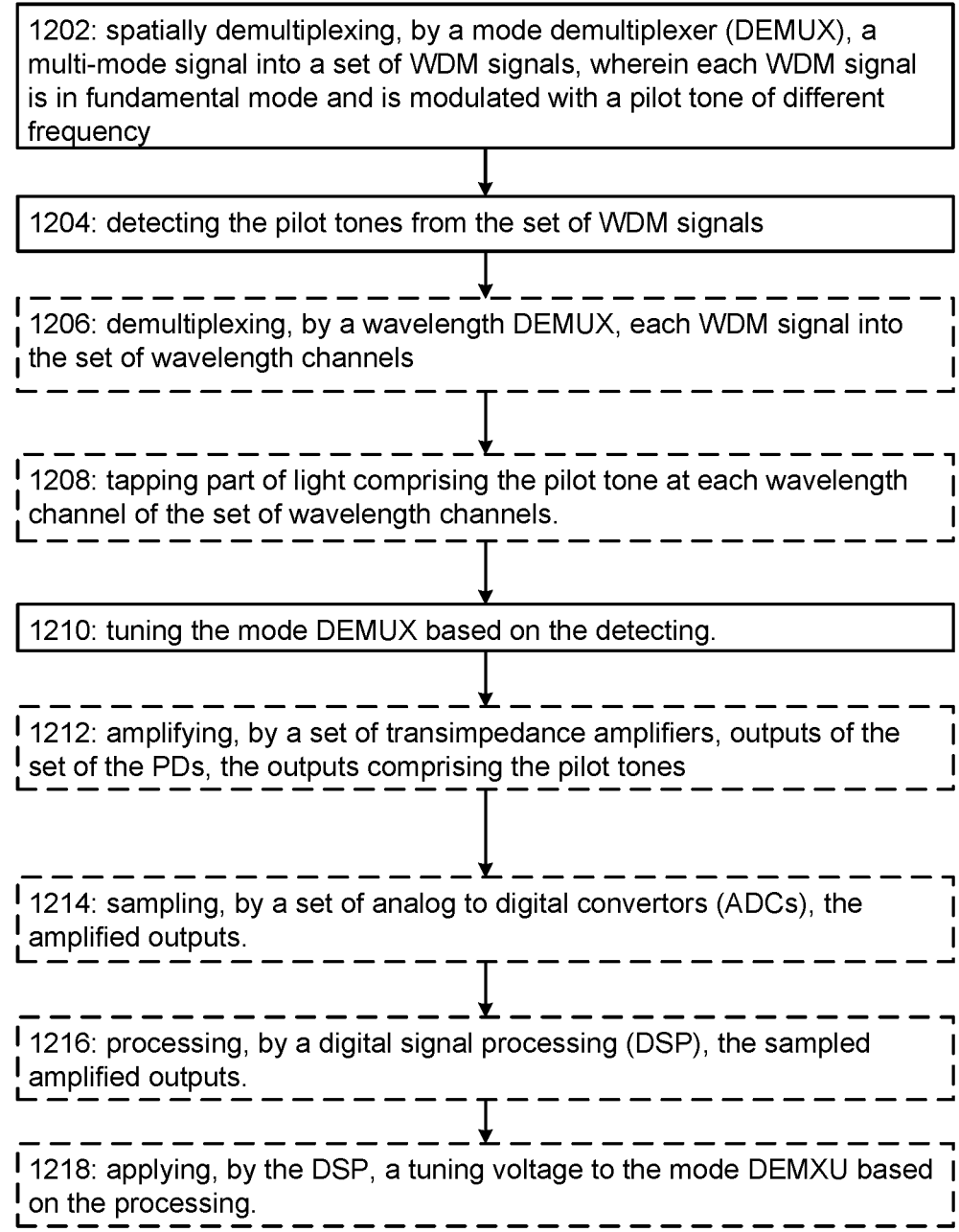
FIG. 12 illustrates a method of optimizing a mode DEMUX, according to an embodiment of the present disclosure.

FIG. 12 illustrates a method of optimizing a mode DEMUX, according to an embodiment of the present disclosure.

The method 1200 may include, at 1202, spatially demultiplexing, by a mode DEMUX, a multi-mode signal into a set of WDM signals, wherein each WDM signal is in fundamental mode and is modulated with a pilot tone of different frequency. The method may further include, at 1204, detecting the pilot tones from the set of WDM signals. The method may further include, at 1210 tuning the mode DEMUX based on the detecting.

In some embodiments, the detecting may include, at 1206, demultiplexing, by a wavelength DEMUX, each WDM signal into the set of wavelength channels. In some embodiments, the detecting may further include, at 1208, tapping part of light comprising the pilot tone at each wavelength channel of the set of wavelength channels. In some embodiments, the detecting may further include detecting, by a set of photodetectors (PDs), the tapped light. In some embodiments, the tapping is performed by a set of single mode tap couplers.

In some embodiments, the tuning may include, at 1212, amplifying, by a set of transimpedance amplifiers, outputs of the set of the PDs, the outputs comprising the pilot tones. In some embodiments, the tuning may further include, at 1214 sampling, by a set of analog to digital convertors (ADCs), the amplified outputs. In some embodiments, the tuning may further include, at 1216, processing, by a digital signal processing (DSP), the sampled amplified outputs. In some embodiments, the tuning may further include, at 1218 applying, by the DSP, a tuning voltage to the mode DEMXU based on the processing.

In some embodiments, the method 1200 may further include processing change in power level of the pilot tones after applying the tuning voltage. In some embodiments, the method 1200 may further include applying, by the DSP, a search algorithm based on the further processing.

In some embodiments, the detecting may include demultiplexing, by a wavelength DEMUX, each WDM signal into the set of wavelength channels. In some embodiments, the detecting may include detecting, by a set of coherent receivers, the pilot tones at each wavelength channel. In some embodiments, the detecting may include processing, by the set of coherent receivers, power levels of the detected pilot tones. In some embodiments, the detecting may include sending, by the set of coherent receivers to a digital signal processing (DSP), the processed power levels.

In some embodiments, the tuning may include applying, by the DSP, a tuning voltage to the mode DEMXU based on the processed power levels. In some embodiments, the method may further include further processing change in power level of the pilot tones after applying the tuning voltage. In some embodiments, the method may further include applying, by the DSP, a search algorithm based on the further processing.

In some embodiments, each WDM signal is modulated via modulating each data channel of each WDM signal with a pilot tone of different frequency.

Embodiments of the present invention can be implemented using electronics and/or photonics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
for each input port of a mode multiplexer (MUX), modulating a wavelength division multiplexing (WDM) signal of a first set of WDM signals with a pilot tone of different frequency, wherein each WDM signal is in fundamental mode;
spatially multiplexing, by the mode MUX, the first set of WDM signals to generate a multi-mode signal, the multimode signal comprising the pilot tones;
detecting the pilot tones from the multi-mode signal, the detected pilot tones corresponding to the first set of WDM signals; and
tuning the mode MUX based on the detecting;
wherein the detecting comprises:
tapping part of the multi-mode signal comprising the pilot tones;
spatially demultiplexing, by a mode demultiplexer (DEMUX), the tapped part of the multi-mode signal into a second set of WDM signals, wherein each WDM signal of the second set of WDM signals is in fundamental mode;
filtering, by a set of optical bandpass filters (OBPF), the second set of WDM signals; and
detecting, by a set of photodetectors (PDs), the filtered set of WDM signals.

2. The method of claim 1, wherein the tuning comprising:
amplifying, by a set of transimpedance amplifiers, outputs of the set of the PDs, the outputs comprising the pilot tones;
sampling, by a set of analog to digital convertors (ADCs), the amplified outputs;
processing, by a digital signal processing (DSP), the sampled amplified outputs; and
applying, by the DSP, a tuning voltage to the mode MUX based on the processing.

3. The method of claim 2 further comprising:
further processing change in power level of the pilot tones after applying the tuning voltage; and
applying, by the DSP, a search algorithm based on the further processing.

4. The method of claim 1, wherein the tapping comprises:
tapping, by a multi-mode coupler, part of the multi-mode signal, the multi-mode coupler placed at the output of the mode MUX.

5. The method of claim 2, wherein the processing comprises:
determining power level of each pilot tone.

6. The method of claim 1, wherein the tapping comprises:
reflecting, by a partial reflector, part of the multi-mode signal, the partial reflector placed at the output of the mode MUX; and
tapping, by a set of optical circulators, the second set of WDM signals.

7. The method of claim 6, wherein the spatially demultiplexing comprises:
spatially demultiplexing, by the mode DEMUX, the reflected part of the multi-mode signal into the second set of WDM signals, wherein each WDM signal of the second set of WDM signals is in fundamental modes.

8. The method of claim 1, wherein the mode DEMUX is the mode MUX in reverse.

9. The method of claim 1, wherein the modulating each WDM signal comprises:
modulating each data channel of each WDM signal with a pilot tone of different frequency.

10. A method comprising:
spatially demultiplexing, by a mode demultiplexer (DEMUX), a multi-mode signal into a set of wavelength division multiplexing (WDM) signals, wherein each WDM signal is in fundamental mode and is modulated with a pilot tone of different frequency;
detecting the pilot tones from the set of WDM signals based on the pilot tone applied to each WDM signal; and
tuning the mode DEMUX based on the detected pilot tones from the set of WDM signals;
wherein the detecting comprises:
demultiplexing, by a wavelength DEMUX, each WDM signal into the set of wavelength channels;

tapping part of light comprising the pilot tone at each wavelength channel of the set of wavelength channels; and detecting, by a set of photodetectors (PDs), the tapped light; or wherein the detecting comprises:
    demultiplexing, by a wavelength DEMUX, each WDM signal into the set of wavelength channels,
    detecting, by a set of coherent receivers, the pilot tones at each wavelength channel;
    processing, by the set of coherent receivers, power levels of the detected pilot tones; and
    sending, by the set of coherent receivers to a digital signal processing (DSP), the processed power levels.

11. The method of claim 10, wherein the tuning comprises:
    amplifying, by a set of transimpedance amplifiers, outputs of the set of the PDs, the outputs comprising the pilot tones;
    sampling, by a set of analog to digital convertors (ADCs), the amplified outputs; and processing, by a digital signal processing (DSP), the sampled amplified outputs; and
    applying, by the DSP, a tuning voltage to the mode DEMUX based on the processing.

12. The method of claim 11 further comprising:
    further processing change in power level of the pilot tones after applying the tuning voltage; and
    applying, by the DSP, a search algorithm based on the further processing.

13. The method of claim 10, wherein the tapping is performed by a set of single mode tap couplers.

14. The method of claim 10, wherein the tuning comprises:
    applying, by the DSP, a tuning voltage to the mode DEMUX based on the processed power levels.

15. The method of claim 14 further comprising:
    further processing change in power level of the pilot tones after applying the tuning voltage; and
    applying, by the DSP, a search algorithm based on the further processing.

16. The method of claim 10, wherein each WDM signal is modulated via modulating each data channel of each WDM signal with a pilot tone of different frequency.

17. An apparatus comprising:
    a receiver;
    a processor; and
    a non-transitory memory storing machine executable instructions, which when executed by the processor, configure the apparatus for:
        for each input port of a mode multiplexer (MUX), modulating a wavelength division multiplexing (WDM) signal of a first set of WDM signals with a pilot tone of different frequency, wherein each WDM signal is in fundamental mode;
        spatially multiplexing, by the mode MUX, the first set of WDM signals to generate a multi-mode signal, the multimode signal comprising the pilot tones;
        detecting the pilot tones from the multi-mode signal, the detected pilot tones corresponding to the first set of WDM signals; and
        tuning the mode MUX based on the detecting:
    wherein the detecting comprises:
        tapping part of the multi-mode signal comprising the pilot tones;
        spatially demultiplexing, by a mode demultiplexer (DEMUX), the tapped part of the multi-mode signal into a second set of WDM signals, wherein each WDM signal of the second set of WDM signals is in fundamental mode;
        filtering, by a set of optical bandpass filters (OBPF), the second set of WDM signals; and
        detecting, by a set of photodetectors (PDs), the filtered set of WDM signals.

* * * * *